United States Patent
Kalbassi et al.

(10) Patent No.: US 9,731,241 B2
(45) Date of Patent: Aug. 15, 2017

(54) RADIAL FLOW ADSORBER 'U' CONFIGURATION

(71) Applicant: AIR PRODUCTS AND CHEMICALS, INC., Allentown, PA (US)

(72) Inventors: Mohammad Ali Kalbassi, Weybridge (GB); Stephen John Gibbon, Banstead (GB); Nasim Ul Hassan Malik, London (GB); Stephen Clyde Tentarelli, Schnecksville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 240 days.

(21) Appl. No.: 14/302,581

(22) Filed: Jun. 12, 2014

(65) Prior Publication Data

US 2015/0360167 A1    Dec. 17, 2015

(51) Int. Cl.
*B01D 53/02* (2006.01)
*B01D 53/04* (2006.01)
*B01D 53/86* (2006.01)

(52) U.S. Cl.
CPC ...... *B01D 53/0431* (2013.01); *B01D 53/0446* (2013.01); *B01D 53/864* (2013.01); *B01D 2253/108* (2013.01); *B01D 2253/34* (2013.01); *B01D 2256/12* (2013.01); *B01D 2257/402* (2013.01); *B01D 2257/404* (2013.01); *B01D 2257/504* (2013.01); *B01D 2257/702* (2013.01);
(Continued)

(58) Field of Classification Search
CPC ......... B01D 2253/108; B01D 2253/34; B01D 2256/12; B01D 2257/402; B01D 2257/404; B01D 2257/504; B01D 2257/702; B01D 2257/80; B01D 2259/40081; B01D 53/0431; B01D 53/0446; B01D 53/864; Y02C 10/08; Y02C 20/10
See application file for complete search history.

(56) References Cited

U.S. PATENT DOCUMENTS 2,997,374 A    8/1961   Lavender, Jr. et al.
3,616,617 A *  11/1971  Groote ............... B01D 45/14
                                                    55/307
(Continued)

FOREIGN PATENT DOCUMENTS

CN    1308561       8/2001
EP    0118349 A1    2/1984
(Continued)

OTHER PUBLICATIONS

Peter J. Higgs, David I. Ellis, and Mohammad S. Ismail, "Evaluation of Pressure Profiles and Overall Pressure Drop for Flow Through Annular Packed Bed Configurations", Gas. Sep. Pm, vol. 9, No. 4, pp. 243-252, 1995; Dr. Ultich Von Gemmingen, "Design of Adsorptive Dryers in Air Separation Plants", Reports on Science and Technology, 54/1994, pp. 8-12.

*Primary Examiner* — Christopher P Jones
(74) *Attorney, Agent, or Firm* — Eric J. Schaal; Bryan C. Hoke, Jr.

(57) ABSTRACT

A radial U-flow adsorption unit for air purification in a TSA process, having a gas outlet at one end and at least one gas inlet at the side, preferably at the same end of the unit as the gas outlet. The simpler design of the unit facilitates manufacture, installation and transport, and reduces the capital and operating costs.

47 Claims, 10 Drawing Sheets

(52) U.S. Cl.
CPC ............... *B01D 2257/80* (2013.01); *B01D 2259/40081* (2013.01); *Y02C 10/08* (2013.01); *Y02C 20/10* (2013.01)

(56) References Cited

U.S. PATENT DOCUMENTS

| | | | |
|---|---|---|---|
| 4,541,851 A | 9/1985 | Bosquain et al. | |
| 4,673,423 A * | 6/1987 | Yumlu | B01D 46/12 55/319 |
| 5,026,407 A * | 6/1991 | Tobey | E03F 1/006 128/205.12 |
| 5,232,479 A | 8/1993 | Poteau | |
| 5,422,081 A * | 6/1995 | Miyagi | B01D 8/00 422/168 |
| 5,716,427 A * | 2/1998 | Andreani | B01D 53/0431 95/117 |
| 5,759,242 A | 6/1998 | Smolarek et al. | |
| 5,814,129 A | 9/1998 | Tentarelli | |
| 5,827,485 A | 10/1998 | Libal et al. | |
| 5,836,362 A | 11/1998 | Ackley et al. | |
| 5,855,685 A | 1/1999 | Tobe et al. | |
| 5,931,980 A | 8/1999 | Lehman | |
| 6,086,659 A * | 7/2000 | Tentarelli | B01D 53/0431 422/179 |
| 6,152,992 A * | 11/2000 | Gemmingen | B01D 53/0431 95/96 |
| 6,506,234 B1 * | 1/2003 | Ackley | B01D 53/04 95/130 |
| 6,770,120 B2 * | 8/2004 | Neu | B01D 53/0431 95/117 |
| 8,101,133 B2 | 1/2012 | Ackley et al. | |
| 8,313,561 B2 | 11/2012 | Celik et al. | |
| 2002/0183571 A1 | 12/2002 | Williams et al. | |
| 2006/0236867 A1 | 10/2006 | Neary et al. | |
| 2009/0314159 A1 * | 12/2009 | Haggerty | B01D 53/02 95/90 |
| 2010/0058804 A1 | 3/2010 | Monereau et al. | |
| 2011/0206573 A1 | 8/2011 | Ackley et al. | |
| 2013/0343961 A1 | 12/2013 | Vetter et al. | |

FOREIGN PATENT DOCUMENTS

| | | |
|---|---|---|
| GB | 397128 | 8/1933 |
| JP | 58041395 | 9/1984 |
| JP | 59162923 | 3/1986 |
| JP | 01164417 A | 6/1989 |
| JP | 10314534 A | 12/1998 |
| JP | 11128646 | 5/1999 |
| JP | 2001293357 | 10/2001 |
| WO | 2012146903 A1 | 11/2012 |

* cited by examiner

SECTION A-A

RADIAL FLOW ADSORBER 'U' CONFIGURATION

BACKGROUND OF THE INVENTION

The present invention relates to radial flow adsorption units for separating a gaseous component from a gas mixture, and particularly for purifying air prior to cryogenic distillation. The invention is primarily concerned with units configured for U-flow operation.

It is standard practice in the cryogenic air separation industry to use radial flow adsorption units for removing contaminants such as water, carbon dioxide, trace hydrocarbons and $NO_x$ from the air feed to the cryogenic air separation plant to avoid issues with plant operation and safety.

A radial flow adsorption unit for air purification is typically a vessel having an outer tubular side wall that is closed at each end with a respective end wall, containing an elongated annular bed of at least one adsorbent material located co-axially within the interior of vessel. There is usually an annular space defined by the inside surface of the outer wall and the outside surface of the annular bed. The annular bed defines a central channel. There is a gas inlet that feeds the gas to be processed to the annular space, and a gas outlet that removes treated gas from the central channel.

In operation, air is usually fed to the annular space surrounding the annular bed. The air passes through the adsorbent material(s) within the annular bed into the central channel. The adsorbent material(s) selectively adsorb at least one contaminant from the air thereby producing purified air which is removed from the vessel.

Less commonly, air to be purified can be fed to the central channel defined by the annular bed and purified air removed from the annular space surrounding the annular bed. In such arrangements, the air passes through the annular bed in the opposite radial direction, i.e. flowing from the central channel to the annular space.

The adsorbent beds are typically regenerated by passing a regeneration gas through the adsorbent bed in the opposite direction to the direction of the air when the unit is in operation, i.e. "on feed" or "on line".

In general, radial flow adsorption units may be operated using a temperature swing adsorption ("TSA") process, a pressure swing adsorption ("PSA") process, a vacuum swing adsorption (VSA) process or a vacuum pressure swing adsorption (VPSA) process, or using modifications of such processes as known in the art. However, units involved in air purification are typically operated using a TSA process, and units involved in the bulk separation of air are typically operated using a PSA or VPSA process. An example of an air purification process generating the feed to a cryogenic air separation unit ("ASU") that involves radial TSA technology is disclosed in U.S. Pat. No. 5,855,685A.

Radial flow adsorption units may be configured in a "U-flow" or "Z-flow" arrangement. In a U-flow arrangement, the paths of the gas on either side of the annular bed are in opposite directions. "U-flow" is also referred to as "π-flow" in the literature. In a Z-flow arrangement, the paths of the gas on either side of the annular bed are in the same direction. In front end air purification in the air separation industry, the primary focus is on the use of radial flow adsorption units configured in a Z-flow arrangement. U.S. Pat. No. 4,541,851A, U.S. Pat. No. 5,827,485A, U.S. Pat. No. 8,313,561B, US2010/0058804A and US2011/0206573A each disclose radial flow adsorption units for air purification in which the units are configured in a Z-flow arrangement. A feature of such units is that the gas inlets and gas outlets are usually at opposite ends of the units.

A feature of a typical Z-flow configuration in a radial flow adsorption unit is unequal pressure drop along the length of the adsorbent bed which leads to non-uniform flow distribution. Attempts to overcome the unequal pressure drop include the use of internal components in the central channel, such as conical baffles. However, incorporating such internal components typically complicates the design of the unit, thereby increasing the overall capital costs, and increases the overall pressure drop through the vessel, thereby increasing the overall operating costs.

The U-flow configuration offers an attractive alternative for radial flow adsorption units since the pressure drop is typically equal along the length of the adsorbent bed resulting in more uniform flow distribution without the need for additional internal components, thereby potentially reducing overall capital and operating costs.

U.S. Pat. No. 5,814,129A discloses radial flow adsorption unit for the pre-purification of air. The unit has a gas inlet at the bottom of the vessel and a gas outlet at the top of the vessel but has been configured for "U-flow" using a cylindrical baffle provided either in the annular space between the side wall of the vessel and the adsorbent bed (see FIG. 1), or in the central channel defined by the annular adsorbent bed (see FIG. 3). The baffle forces the gas to flow in the annular space towards the top of the vessel from the inlet before passing through the bed (see FIG. 1), or towards the bottom of vessel after passing through the bed and before being removed via the outlet (see FIG. 3). A similar arrangement is disclosed in U.S. Pat. No. 5,759,242A (see FIG. 1).

While the radial flow adsorption units disclosed in U.S. Pat. No. 5,814,129A represent an improvement over typical units configured for Z-flow because of the improved flow distribution through the adsorbent bed, the design of the unit is still more complicated than ideal and the presence of the cylindrical baffle increases overall pressure drop through the vessel. Therefore, there is still a need for new designs of radial flow adsorption units.

In terms of uniform flow distribution, the ideal arrangement for a radial flow adsorption unit is theoretically a U-flow configuration with a co-axial gas inlet and gas outlet at one end of the unit since this arrangement potentially provides the most uniform flow distribution. Examples of references disclosing such arrangements include U.S. Pat. No. 5,759,242A (see FIG. 4). The units are intended primarily for PSA or VPSA operation in an oxygen cycle but the reference mentions that the units can be modified for use in PSA pre-purification of air. However, the units are complicated mechanically which increases the capital cost.

Further radial flow adsorption units for air purification which are configured in a "U-flow" arrangement are disclosed in U.S. Pat. No. 8,313,561B (see FIG. 2(e)). This reference mentions that the unit can be configured so that the air inlet and outlet are both either in the top wall or the bottom wall of the vessel, and that the air to be purified can be fed either to the central channel defined by the annular bed, or to the annular space between the annular bed and the outside wall of the vessel.

In addition to radial flow adsorption units configured in a "Z-flow" arrangement, U.S. Pat. No. 4,541,851A also discloses (see FIG. 4) such a unit configured in a "U-flow" arrangement for air purification. The unit has an air inlet in the bottom wall of the unit that feeds the central channel defined by the annular bed of adsorbent material. The air passes through the adsorbent bed to the annular space between the bed and the side wall of the unit. The purified air is removed from unit using a gas outlet also provided in the bottom wall of the unit.

An example of a radial flow adsorption vessel configured in a "U-flow" arrangement for the bulk separation of air in which the gas inlet and gas outlet are located separately in the bottom wall of the vessel is disclosed in U.S. Pat. No. 5,232,479A (see FIG. 1).

In general, radial flow adsorption units tend to be large, particularly for certain applications where a large amount of gas needs to be processed. An example of such an application is front-end air purification for a cryogenic ASU. Such units may have an overall height/length of up to 25 m and the associated pipework may have a diameter of up to 72 inches (1.8 m) for larger plants, e.g. 56 inches (1.4 m) for the gas inlet and 42 inches (1 m) for the gas outlet.

Units are typically orientated vertically to reduce the size of their footprint. Height is a particular issue for units configured for Z-flow since such units tend to have their inlets and outlets at opposite ends of the units. This means that there will be piping exiting the 'top' of the vessel and running down to ground. Piping at low level is easier and less expensive to construct, support and maintain than piping at high levels. Units configured for U-flow tend to have their inlets and outlets in the same end wall which mitigates somewhat the issues due to height. However, the size of the pipework means that the head having the inlet and the outlet can be very congested which limits the options for the layout of the pipework.

Radial flow adsorption units are typically capable of being pressurized to at least 5 bar and possibly up to 40 bar. Thus, it is necessary to reinforce the head around each gas inlet and gas outlet by thickening the wall. Where the gas inlet and gas outlet are in the same head, the reinforcements can overlap resulting in an even thicker end wall.

The walls of a radial flow adsorption unit are typically made from carbon steel. If the thickness of a wall made from this material exceeds about 38 mm, then the unit must undergo post-weld heat treatment in which the entire shell of the unit or just the thicker component parts are heated in a furnace to a high temperature, e.g. from about 550 to about 600° C., for a period of time (depending on the thickness), e.g. 0.5 hours, as defined by the relevant pressure vessel fabrication code. In addition, the heating and cooling rates must be carefully controlled, together with the atmosphere inside the furnace. The size of the units is such that the furnace often has to be built around the unit. Post weld heat treatment is therefore an expensive process which is desirable to avoid if possible.

The Inventors also note that the end wall, or "head", of a radial flow adsorption unit tends to have a larger diameter if two or more gas inlet/outlet nozzles are located there. Since radial flow adsorption units are usually fabricated in a factory and then transported to site at least in part by road using a flatbed lorry, larger diameter units tend to be more difficult to transport, e.g. on narrow roads with low bridges. Alternatively, if the end wall is made of optimal diameter, then some compromise may have to be made regarding the inlet and outlet nozzle sizes (they may have to be smaller than desired, leading to higher pressure drop).

BRIEF SUMMARY OF THE INVENTION

According to a first aspect of the present invention, there is provided a radial U-flow adsorption unit for removing at least one gaseous component from a gas mixture, said unit comprising:

an outer tubular side wall comprising a first end and a second end opposite said first end, said first and second ends being closed by first and second end walls respectively;

an elongated annular bed comprising at least one selectively adsorbent material, said annular bed being located co-axially within said outer tubular side wall thereby defining a first annular space between said side wall and said annular bed, said annular bed defining a central channel in fluid communication with said first annular space through said annular bed;

at least one gas inlet located in said side wall in fluid communication with said first annular space; and a gas outlet located in an end wall of said unit and in fluid communication with said central channel.

The gas inlet or, where there is more than one gas inlet, each gas inlet is preferably located at the end of the side wall adjacent the end wall comprising the gas outlet.

The present invention enables a simpler design of radial flow adsorption unit which may result in a significant reduction in the capital and operating costs of the unit. In addition, congestion of the head having the gas outlet may be avoided which reduces the likelihood that post weld heat treatment would be required, particularly for some larger units. Further, less congestion around the gas inlets and gas outlets should result in a greater freedom in the design of the layout of the associated pipework. Moreover, the invention means that it should be possible to design units having optimum diameter, height and weight which should make the unit easier to transport.

The unit of the present invention has both the gas inlet(s) and the gas outlet at one end, preferably at "grade level" (i.e. ground level), which eases piping construction and valve maintenance access. In addition, by using a "U-flow" arrangement as described herein, the invention enables the construction of a simpler adsorber unit which is easier, less expensive and safer to construct and more reliable to operate, therefore enabling savings in manufacturing and operating costs.

In preferred embodiments, the annular adsorbent bed is supported directly on an end wall, and usually on the bottom wall when the unit is orientated vertically.

The unit is ideally designed and constructed such that internal baffles for reducing gas flow maldistribution are not required. However, the unit may also comprise one or more baffles, deflectors and/or flow straighteners for improving feed gas flow distribution within the unit.

The present invention may be used for the bulk separation of a gas mixture such as air, e.g. to produce oxygen, although the invention is primarily intended for the purification of a gas such as air by removing at least one contaminant, typically selected from the group consisting of carbon dioxide, water, hydrocarbons and $NO_x$. The purified air is then suitable as feed to an ASU.

The term "$NO_x$" is used herein to refer to the oxides of nitrogen, and is intended to include one or more of nitric oxide (NO), nitrogen dioxide ($NO_2$), dinitrogen tetroxide ($N_2O_4$), dinitrogen pentoxide ($N_2O_5$) and nitrous oxide ($N_2O$). The presence of nitrous oxide as a contaminant is a particular problem in air purification as it is difficult to remove.

Thus, according to a second aspect of the present invention, there is provided a process for removing at least one gaseous component from a gas mixture, said process comprising:

providing a radial adsorption unit according to the first aspect;

feeding a gas mixture to said at least one gas inlet; and removing a product gas from said gas outlet.

According to a third aspect of the present invention, there is provided a use of a radial adsorption unit according to the first aspect for purifying air by removing a contaminant selected from the group consisting of water, carbon dioxide, hydrocarbons and $NO_x$.

DETAILED DESCRIPTION OF THE INVENTION

Figure 1:
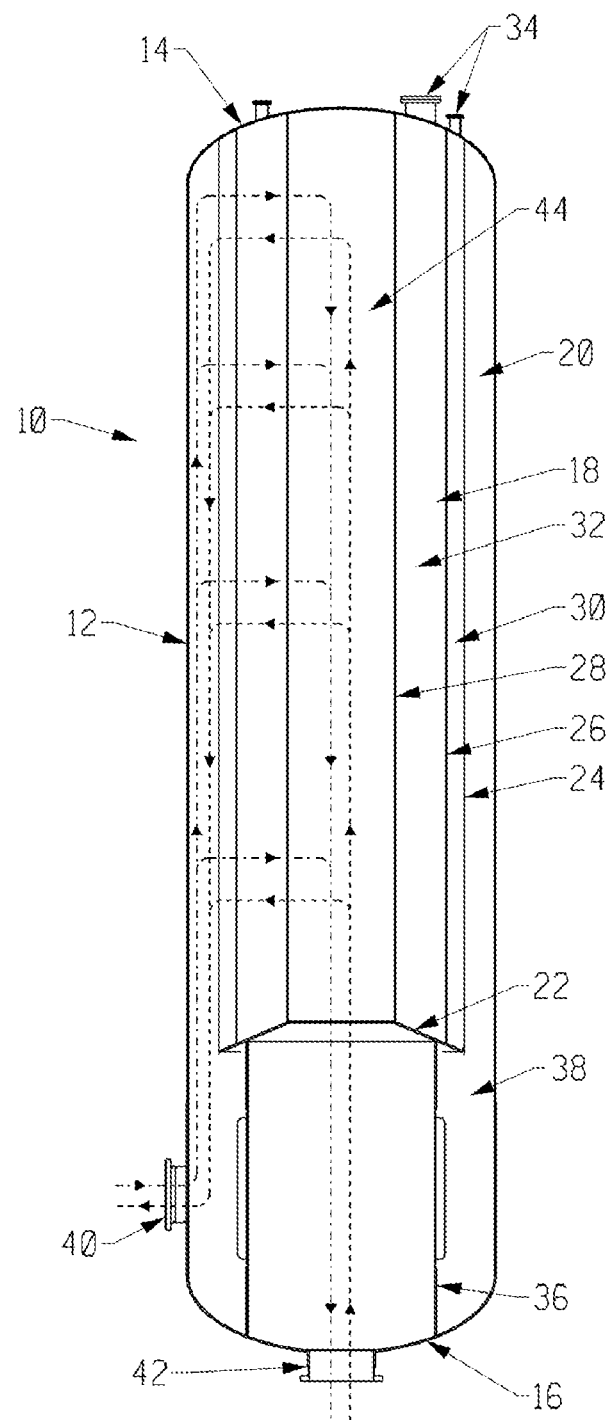
FIG. 1 is a simplified diagram depicting a first embodiment of the present invention in vertical cross-section in which the annular bed is supported on the bottom end wall of the unit, and the gas inlet and gas outlet are located at the bottom of the unit.

All references herein to pressure are references to absolute pressure and not gauge pressure unless expressly stated otherwise. In addition, references to the singular should be interpreted as including the plural and vice versa, unless it is clear from the context that only the singular or plural is meant. Further, unless expressly stated otherwise, fluid compositions are calculated in mol. % on a "dry" basis, i.e. excluding any water content from the calculations.

Overview

The invention is a radial U-flow adsorption unit for removing at least one gaseous component from a gas mixture. The unit comprises an outer tubular side wall comprising a first end and a second end opposite the first end, and the first and second ends are closed by first and second end walls, or "heads", respectively. The unit also comprises an elongated annular bed comprising at least one selectively adsorbent material located co-axially within the outer tubular side wall thereby defining a first annular space between the side wall and the annular bed. The annular bed defines a central channel in fluid communication with the first annular space through the annular bed. At least one gas inlet is located in the side wall in fluid communication with the first annular space and a gas outlet is located in an end wall of the unit in fluid communication with the central channel.

The characterizing feature of preferred embodiments of the present invention is that the gas inlet(s) is/are located in the side wall of the unit. This feature enables simpler designs of radial flow adsorption unit that are less congested with gas inlet/outlet pipework and consequently less expensive to produce and operate.

In preferred embodiments, the or each gas inlet is at the end of the side wall adjacent the end wall that comprises the gas outlet. This novel arrangement is beneficial because it enables the design of radial flow adsorption units in which the gas inlets/outlets are at the same end of the units which can reduced the overall height of the apparatus off the ground compared to typical Z-flow units and facilitates access to the inlet(s) and outlet and the associated pipework for maintenance, etc. The diameter of the unit may also be reduced for a given application compared to other units of known design having gas inlet(s) and gas outlet(s) in the same end wall, which facilitates transport of the unit by road.

The terms "inlet" and "outlet" have been used to provide an indication of the direction of gas flow though the unit. In some embodiments, this gas flow is during operation to remove a component from a gas mixture (i.e. on-feed) in which case the direction would be reversed during regeneration. In other embodiments, this gas flow is during regeneration of the annular bed in which case the direction would be reversed when on-feed.

The following terms used in the specification are defined as follows:

"radial flow" is a term of art referring to the direction of flow of gas within the unit relative to the central longitudinal axis of the unit;

"U-flow" is a term of art referring to a configuration in which the flow of gas on one side of the absorbent bed is reversed on the other side;

"tubular" is a standard term meaning having the shape of a tube;

"elongated" is a standard term referring to the aspect ratio of the annular bed in which the length is greater than the width;

"co-axially" is a standard term meaning having the same axis, or substantially the same axis. The term is used in the context of the central longitudinal axis of the unit; and "fluid communication" is a standard term meaning that fluid is able to flow between the features defined by the term. In this case, the fluid is a gas, i.e. gas flow communication.

The annular bed typically comprises a base plate and at least two co-axial tubular gas permeable screens, e.g. an inner screen located within an outer screen. The base plate may be flat or at least substantially convex having spherical, torispherical, elliptical or similar geometry. However, in some preferred embodiments, the base plate is frustoconical. The screens define an annular space that is filled with at least one selectively adsorbent material.

For some applications, the annular bed comprises at least one further gas permeable screen located co-axially between the inner and outer screens thereby dividing the annular space into an inner annular space and an outer annular space. Different selectively adsorbent materials may be provided in the inner and outer annular spaces defined by the screens depending on the application. In air purification applications for example, a desiccant with a high regenerable capacity for water may be located in one of the annular spaces defined by the screens, e.g. the outer annular space, and a $CO_2$-selective adsorbent may be located in the other annular space defined by the screens, e.g. the inner annular space. Examples of suitable $CO_2$-selective adsorbents include molecular sieves, e.g. NaX, NaLSX, CaX and CaLSX.

It is also intended that the present invention could be applied to radial U-flow adsorption units having an adsorbent bed comprising at least two annular layers of different adsorbent material without a gas permeable screen to separate the annular layers. Loading an adsorbent bed with a removable middle screen is discussed in U.S. Pat. No. 5,931,980A, U.S. Pat. No. 5,836,362A and U.S. Pat. No. 8,101,133B.

Orientation

There may be particular applications where it is desirable to operate the unit in an orientation other than vertical. For example, it may be desirable for the unit to be orientated horizontally. However, in most circumstances, the unit is orientated vertically. In such embodiments, the unit will have a top and a bottom, with for example the first end being assigned to the top of the unit and the second end being assigned to the bottom of the unit.

Where the unit is orientated vertically, the gas inlet(s) and the gas outlet may be at the top of the unit. However, in preferred embodiments, the gas inlet(s) and the gas outlet are at the bottom of the unit. In this way, the inlet(s)/outlet and the associated pipework are at "grade-level" which makes the unit more accessible and safer for maintenance purposes.

Multiple Gas Inlets

The unit may have a single gas inlet, or a plurality of gas inlets. The gas inlet or, where there is more than one, at least one and preferably each gas inlet is orientated radially to the longitudinal axis of the unit. Radial orientation of the gas inlet provides an initial gas flow into the unit that is perpendicular to the longitudinal axis of the unit.

Where the unit has more than one gas inlet, the number of gas inlets is limited to at least some extent by the diameter of the unit. However, for most embodiments, the number of gas inlets may be from one to six, e.g. from one to four such as one or two.

Where the unit comprises more than one gas inlet, the gas inlets are spaced circumferentially around the outer tubular side wall as this arrangement tends to reduce gas flow maldistribution within the unit. The term "circumferentially" in this context is intended to mean that the gas inlets are located around the circumference of the outer tubular side wall, preferably at the same, or substantially the same, level.

The inlets may be evenly or unevenly spaced as required to make the gas flow through the unit as uniform as possible. For example, in embodiments where the unit comprises a first gas inlet and a second gas inlet, the second gas inlet is typically located directly opposite the first gas inlet.

Support for Annular Bed

The unit preferably comprises an impermeable annular skirt supporting the annular bed on one of the end walls. In such embodiments, the annular skirt is typically located co-axially within the outer tubular side wall thereby defining a second annular space in fluid communication with the first annular space.

The bed may be supported by the impermeable annular skirt from the first end wall at the top by the unit. However, in preferred embodiments, the bed is supported by the annular skirt on the second end wall at the bottom of the unit.

The gas outlet is preferably located in the second end wall at the bottom of the unit. In embodiments where the bed is supported by the annular skirt on the second end wall at the bottom of the unit, the gas outlet is located preferably in the second end wall. In such embodiments, the gas inlet or, where there is more than one gas inlet, each gas inlet is located in the side wall at the end adjacent the second end wall at the bottom of the unit.

Baffles

Units according to the present invention are preferably designed and operated such that there is no significant maldistribution of gas in the first annular space. Ideally, such embodiments would comprise no baffles in order to minimize the pressure drop through the vessel.

Flow studies using computational fluid dynamics (CFD) software (Fluent®, Ansys Inc.) indicate, however, that there may be some circumferential gas flow and/or vortices that develop within the first annular space of the unit. These undesirable gas flow patterns are caused by imperfect gas flow distribution between the gas inlet(s) and the first annular space, for example in the second annular space. Non-uniform gas flow to the annular bed results in sub-optimal use of the adsorbent material within the annular bed and hence process inefficiencies and even premature "break through" in some areas. Thus, the inventors propose the use of gas flow control surfaces, or "baffles", to reduce gas flow maldistribution in the first annular space of the unit where necessary.

Thus, the unit preferably comprises at least one baffle. The purpose of the baffle is to reduce gas flow maldistribution through the unit thereby enabling optimization of the performance of the unit.

Preferred baffles include annular baffles, longitudinal baffles, frustoconical baffles, cylindrical baffles and gas inlet baffles, and particular combinations of two or more of these types of baffles may be chosen to optimize gas flow distribution through the unit as required.

The baffle or, where there is more than one baffle, each baffle may be solid, i.e. unperforated. In other embodiments, the or at least one of the baffles may be perforated to modify gas flow through the unit. Baffles may be perforated uniformly, i.e. having a uniform pattern and/or distribution of perforations, or may be perforated non-uniformly as required. The size, shape and/or distribution of the perforations may be selected to further refine gas flow distribution.

A perforated baffle will have an "open area", i.e. the percentage of the total surface area of the baffle that is open to the passage of gas through the baffle. Perforated baffles typically have an open area from about 10% to about 60%.

Annular Baffles

The unit may comprise at least one annular baffle located co-axially within the unit between the gas inlet(s) and the annular bed. The or each annular baffle extends at least partially across the second annular space.

The annular baffle has an inner circumference and an outer circumference. The distance between the inner and outer circumferences may be uniform around the entire circumference of the annular baffle. Alternatively, the distance may vary depending perhaps on distance from the gas inlet(s). In other words, while the outer circumference is typically circular, the inner circumference may be circular, or may be non-circular, e.g. ovoid or sinusoidal, depending on the gas flow distribution requirements.

The design of the annular baffle depends on the requirement for reducing gas flow maldistribution in a given unit. That said, the or each annular baffle is typically in the form of a ring. However, the baffle may be made up of a plurality of sections, perhaps with a gap between adjacent sections. Indeed, the adjacent sections may not be in the same plane.

The annular baffle or, where there is more than one annular baffle, at least one of the annular baffles may extend from the outer tubular side wall. Additionally or alternatively, the annular baffle or, where there is more than one annular baffle, at least one of the annular baffles may extend from the annular skirt. Since the annular baffle(s) extends at least partially across the second annular space, it is implicit that the annular baffle(s) is/are mounted on the inside surface of the outer tubular side wall and/or on the outside surface of the annular skirt.

In some embodiments, the unit comprises a perforated annular baffle that extends at least substantially, and preferably completely, across the second annular space. The purpose of such a perforated annular baffle is typically to straighten the flow of gas through the second annular space to the first annular space.

The perforated annular baffle may extend perpendicularly between the outer tubular side wall and the annular skirt. However, in some preferred embodiments, the perforated annular baffle extends at an angle to the annular skirt to prevent accumulation of aqueous liquid on the surface of the baffle which may cause corrosion. The angle of the perforated annular baffle may be from about 45° to about 90°, e.g. from about 60° to about 80°.

The perforated annular baffle may be a single plate, or may comprise a plurality of individual sections, e.g. trapezoidal sections.

In preferred embodiments, the unit comprises a first annular baffle extending radially from the annular skirt between the gas inlet(s) and the annular bed, and a second annular baffle extending radially from the outer tubular side wall between the first annular baffle and the annular bed. The baffles are located co-axially within the unit and extend partially across the second annular space. The order to the first and second annular baffles may also be reversed as required.

Longitudinal Baffles

The unit may comprise at least one longitudinal baffle mounted in the unit parallel to the longitudinal axis of the unit and extending at least partially across the first annular space.

The unit may comprise a plurality of such longitudinal baffles. In such embodiments, the longitudinal baffles are usually spaced circumferentially within the unit. The baffles may be spaced evenly or unevenly around the circumference of the unit.

The or each longitudinal baffle may extend from the annular bed but would usually extend from the outer tubular side wall.

Additionally or alternatively, the unit may comprises at least one longitudinal baffle mounted in the unit parallel to the longitudinal axis of the unit, the or each longitudinal baffle extending at least partially across the second annular space.

The unit may comprise a plurality of such longitudinal baffles. In such embodiments, the longitudinal baffles are typically spaced circumferentially in the unit. The baffles may be spaced evenly or unevenly around the circumference of the unit.

Longitudinal baffles may be mounted on the outer tubular side wall and extend partially across the second annular space towards the annular skirt. Additionally or alternatively, longitudinal baffles may be mounted on the annular skirt and extend partially across the second annular space towards the outer tubular side wall.

The or each longitudinal baffle may extend into the first or second annular space to the same extent along the length of the baffle. Alternatively, the extent to which one or more of the baffles extends into the annular space may vary along the length of the baffle. In other embodiments, the length of one or more of the baffles may additionally or alternatively vary depending on the distance from the gas inlet(s).

The unit would comprise as many longitudinal baffles as required to provide an acceptable balance between reducing gas flow maldistribution and increasing pressure drop for a given application. For example, the unit could include up to 300 longitudinal baffles in total, arranged in up to 6 sets, each set located at a specific "elevation", or distance along the length of the unit as measured from one end, as required. Each set may have up to 50, e.g. from 2 to 24 or from 4 to 12, of the longitudinal baffles.

Inlet Baffles

In embodiments in which an annular skirt is used to support the annular bed on an end wall and the gas inlet(s) feed gas into the second annular space, gas flow through the gas inlet(s) will impinge directly on the annular skirt. A part of the inlet feed gas will be forced to flow directly to the first annular space and the annular bed. The remaining part of the feed gas will flow around the annular skirt in a circumferential direction before turning to flow towards the first annular space. Such a complex inlet arrangement may result in non-uniform distribution of gas flow towards and through the first annular space. The Inventors propose the use of inlet deflectors to reduce the non-uniform distribution of gas flow from the inlet arrangements of the unit.

Perforated Inlet Baffle

In other embodiments, the unit may comprise a gas inlet baffle. The gas inlet comprises, with respect to the annular bed, a proximal side and a distal side. The gas inlet baffle is typically located at the proximal side of the gas inlet and extends across at least a portion of the second annular space. The gas inlet baffle may be solid but is preferably perforated to avoid dead space directly above the baffle.

In preferred embodiments, the gas inlet baffle surrounds at least a portion of the proximal side of the gas inlet. In such embodiments, the gas inlet baffle may have an at least substantially U-shaped cross-section. For example, the gas inlet baffle may be made of flat sections forming part of an open polygon or, in preferred embodiments, may have a semi-circular cross-section.

The perforated baffle may be mounted on the outer tubular side wall or on the annular skirt, or may be mounted at one end on the outer side wall and at the other end on the annular skirt.

The perforated baffle limits initial gas flow towards the first annular space and deflects some of the flow away from the first annular space towards the end wall of the vessel giving the gas time and space for redistribution in the circumferential direction. Such redistribution improves gas flow in the first annular space.

Frustoconical Baffle

In some embodiments, the unit comprises a frustoconical baffle located co-axially in the second annular space. The frustoconical baffle is positioned in front of and spaced apart from the gas inlet(s). The purpose of the frustoconical baffle is to provide a crude circumferential gas flow and either a diverging chamber or a converging chamber through which at least a portion of the gas flows prior to being fed to the first annular space.

The term "frustoconical" in this context means having the form of a truncated cone. The frustoconical baffle comprises a first end and a second end opposite the first end. The first end typically has a smaller circumference than the second end.

The frustoconical baffle may comprise, with respect to the annular bed, a proximal end and a distal end, and the baffle may be mounted circumferentially at the proximal end on the outer tubular side wall. The proximal end may comprise an annular flange which may be perforated or non-perforated.

The frustoconical baffle is preferably inverted but may be non-inverted.

The term "inverted" in this context means that the end having the larger circumference is nearer the annular bed than the end having the smaller circumference. In such embodiments, gas that is diverted away from the annular bed initially is forced around the second annular space, turns around the first end of the baffle and enters a diverging chamber before flowing towards the first annular space. The velocity of the gas is reduced which provides a more uniform flow.

The term "non-inverted" in this context means that the end having the smaller circumference is nearer the annular bed than the end having the larger circumference. In such embodiments, gas that is diverted away from the annular bed initially is forced around the second annular space, turns around the second end of the baffle and enters a converging chamber before flowing towards the first annular space.

The end of the frustoconical baffle proximal to the annular bed is usually mounted circumferentially on the outer tubular side wall, typically with an annular flange. Either the frustoconical baffle or the annular flange, or both the baffle and the flange may be perforated.

Alternatively, the end of the frustoconical baffle proximal to the annular bed may be mounted circumferentially on the annular skirt, typically with an annular flange. In such embodiments, there is usually an opening in the baffle opposite the gas inlet and the gas inlet may comprise a conduit in fluid communication with the opening. One or more of the baffle, flange and conduit may be perforated.

Cylindrical Baffle

In other embodiments, the radial adsorption unit a cylindrical baffle located co-axially in the second annular space. The cylindrical baffle is positioned in front of and spaced apart from the at least one gas inlet. As with the frustoconical baffle, the purpose of the cylindrical baffle is to initially force a "crude" circumferential gas flow thereby increasing the distance and time taken for the gas to reach the first annular space which improves the gas flow distribution.

The cylindrical baffle typically comprises, with respect to the annular bed, a proximal end and a distal end. The proximal end may be mounted circumferentially on the annular skirt with an annular flange. In such embodiments, the cylindrical baffle typically comprises an opening opposite the gas inlet. Additionally, the gas inlet may comprise a conduit in fluid communication with the opening. One or more of the baffle, annular flange and the conduit may be perforated.

Alternatively, the proximal end may be mounted on the outer tubular side wall with an annular flange which may be perforated.

Pressure

The unit is typically intended for air purification, e.g. in TSA process. In such processes the unit must be pressurizable, i.e. able to withstand pressures significantly greater than atmospheric pressure. In this regard, the unit is preferably rated for operation at a pressure of at least about 3 bar, e.g. at least about 4 bar or at least about 5 bar. The unit may be rated for operation at a pressure of up to about 40 bar, e.g. up to about 30 bar, perhaps more typically up to about 20 bar or perhaps more typically still up to about 10 bar. In preferred embodiments, the unit is rated for an inlet pressure from about 4 bar to about 7 bar.

Filter

The unit may comprise an internal filter located at the gas outlet to trap particulates entrained in the gas flow from the adsorbent bed. Clogged or dirty filters may be removed and replaced, perhaps after cleaning. Alternatively, the filter may be "self-cleaning" in which the particulates are blown out of the filter during regeneration of the adsorbent bed.

Dimensions

Figure 2:
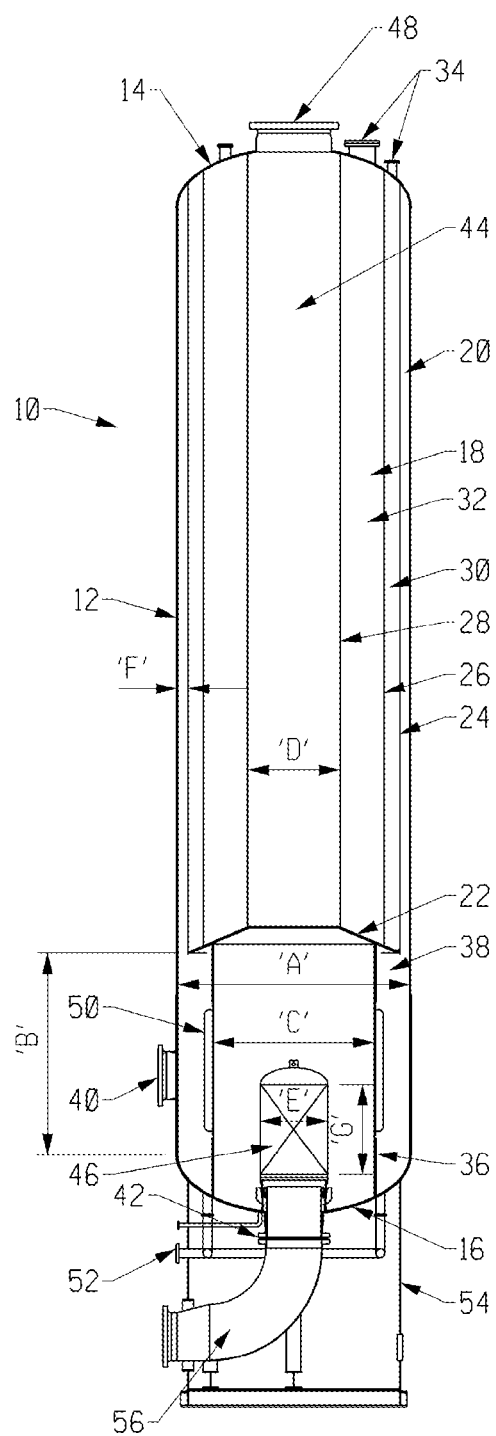
FIG. 2 is a more detailed diagram of the first embodiment depicted in FIG. 1.

The unit exemplified in FIG. 2 may comprise the following dimensions:

A inner diameter of the unit

B separation between the end of side wall and the end of adsorbent bed

C inner diameter of the annular skirt

D diameter of the central channel defined by the annular bed

E diameter of filter

F separation of the inner surface of the outer tubular side wall and the outer surface of the annular bed, i.e. the width of the first annular space G height of the filter The following preferred geometrical relationships have been determined for the present invention:

the ratio of A to B is preferably from about 2:1 (i.e. 2) to about 1:2 (i.e. 0.5), more preferably from about 3:2 (i.e. 1.5) to about 2:3 (i.e. 0.66), and most preferably from about 1:1 (i.e. 1);

the ratio of A to C is preferably from about 3:1 (i.e. 3) to about 11:10 (i.e. 1.1), more preferably from about 5:2 (i.e. 2.5) to about 21:20 (i.e. 1.05), and most preferably about 3:2 (i.e. 1.5);

the ratio of D to E is preferably from about 2:1 (i.e. 2) to about 11:10 (i.e. 1.1), more preferably from about 3:2 (i.e. 1.5) to about 11:10 (i.e. 1.1), and most preferably about 6:5 (i.e. 1.2); and the ratio of B to G is preferably about 3:1 (i.e. 3) to about 11:10 (i.e. 1.1), more preferably from about 2:1 (i.e. 2) to about 5:4 (i.e. 1.25), and most preferably about 3:2 (i.e. 1.5).

The following preferred dimensions have also been determined:

D is preferably from about 1 m to about 2.5 m, and more preferably from about 1.5 m to about 2 m;

F is preferably from about 0.05 m to about 0.6 m, and more preferably from about 0.1 m to about 0.3 m; and A is preferably from about 3 m to about 6 m, and more preferably from about 4 m to about 5 m.

The overall length of the unit depends on column diameter A and the application to which the unit is to be applied. However, for air purification, the length is typically from about 15 m to about 30 m.

The invention is intended for application to units of any suitable size, rated for operation at any suitable pressure and made from any suitable material. However, there is a particular benefit for some embodiments in which the outer tubular side wall and the end walls comprise carbon steel. In these particular embodiments, the absence of overlapping reinforcements in the head may mean that the thickness of the head can be kept below about 38 mm thereby avoiding post-weld heat treatment which would have been required if it were not for the present invention.

An example of the sort of unit which may benefit from this particular advantage is the AP9 unit of Air Products and Chemicals, Inc. This particular unit has an internal diameter of 4.4 m. The thickness of the side wall is 17 mm except at the lower region having the air inlet which is thickened to 32 mm. The unit has 2:1 semi-ellipsoidal heads of 30 mm thickness. The distance between the tangential points where the curvature of each head starts (the "tan-to-tan" length) is about 18.6 m and the active bed length of about 12.7 m. The walls of the air inlet and of the filter removal port are 37 mm thick. The unit is rated for operation at about 6 bar.

Uses

The radial flow adsorption unit is suitable for use in separating a gaseous component from a gas mixture thereby producing a product gas. The gaseous component may be a significant component in the mixture in which case the unit may be used for bulk separation of gases, e.g. for producing oxygen from air. However, in preferred embodiments, the gaseous component is a contaminant in a gas stream in which case the unit may be used for gas purification, e.g. purification of feed air to a cryogenic ASU. In such cases, the gaseous component may be one or more of water, carbon dioxide, trace hydrocarbons and oxides of nitrogen, or $NO_x$.

The unit may be operated in a TSA process, a PSA process, a VSA process or a VPSA process, or in modifications of such processes as known in the art, e.g. TEPSA or TPSA. For air purification, the unit is preferably operated in a TSA process. A suitable TSA process is described in U.S. Pat. No. 5,855,650A.

The unit is intended primarily for air purification applications involving air flow rates of up to about 0.5 million $Nm^3/h$, and even up to 0.8 million $Nm^3/h$, per unit and is therefore sized accordingly.

The annular bed may also comprise a catalyst, e.g. an oxidation catalyst, to facilitate a reaction of at least one of the gaseous components of the gas mixture, e.g. oxidation of carbon monoxide to carbon dioxide.

Aspects include:

1. A radial U-flow adsorption unit for removing at least one gaseous component from a gas mixture, said unit comprising:

an outer tubular side wall comprising a first end and a second end opposite said first end, said first and second ends being closed by first and second end walls respectively;

an elongated annular bed comprising at least one selectively adsorbent material, said annular bed being located co-axially within said outer tubular side wall thereby defining a first annular space between said side wall and said annular bed, said annular bed defining a central channel in fluid communication with said first annular space through said annular bed;

at least one gas inlet located in said side wall and in fluid communication with said first annular space; and a gas outlet located in an end wall of said unit and in fluid communication with said central channel.

2. An adsorption unit according to #1, wherein said at least one gas inlet is located at said end of said side wall adjacent said end wall that comprises said gas outlet.

3. An adsorption unit according to #1 or #2, wherein said unit is orientated vertically, said unit thereby having a top and a bottom, said first end being at the top of said unit and said second end being at the bottom of said unit.

4. An adsorption unit according to #3, wherein said at least one gas inlet and said gas outlet are at the bottom of said unit.

5. An adsorption unit according to any of #1 to #4, wherein said unit comprises a plurality of gas inlets.

6. An adsorption unit according to #5, wherein said gas inlets are spaced circumferentially around said outer tubular side wall.

7. An adsorption unit according to #6, wherein said gas inlets are evenly spaced.

8. An adsorption unit according to #6 or #7, wherein each gas inlet is located at a distance from said annular bed, said distance being equal for each gas inlet.

9. An adsorption unit according to any of #1 to #8, wherein said unit comprises a first gas inlet and a second gas inlet.

10. An adsorption unit according to #9, wherein said second gas inlet is located opposite said first gas inlet.

11. An adsorption unit according to any of #1 to #4, wherein said unit comprises a single gas inlet.

12. An adsorption unit according to any of #1 to #11, wherein said unit has a longitudinal axis and said at least one gas inlet is orientated radially to said longitudinal axis.

13. An adsorption unit according to any of #1 to #12, wherein said unit comprises an impermeable annular skirt supporting said annular bed on one of said end walls, said annular skirt being located co-axially within said outer tubular side wall thereby defining a second annular space in fluid communication with said first annular space.

14. An adsorption unit according to #13, wherein said impermeable annular skirt supports said annular bed on said second end wall at the bottom of said unit.

15. An adsorption unit according to #13 or #14, wherein said gas outlet is located in said second end wall at the bottom of said unit.

16. An adsorption unit according to #15, wherein said at least one gas inlet is located at said end of said side wall adjacent said second end wall at the bottom of said unit.

17. An adsorption unit according to any of #1 to #16, wherein said unit comprises at least one baffle for reducing gas flow maldistribution in said first annular space.

18. An adsorption unit according to #17, wherein said at least one baffle is selected from the group consisting of annular baffles, longitudinal baffles, frustoconical baffles, cylindrical baffles and gas inlet baffles.

19. An adsorption unit according to #17 or #18, wherein said baffle or, where there is more than one baffle, at least one of said baffles is perforated.

20. An adsorption unit according to #19, wherein said perforated baffle has an open area from about 10% to about 60%.

21. An adsorption unit according to any of #1 to #20, wherein said unit comprises at least one annular baffle located co-axially within said unit between said at least one gas inlet and said annular bed, said at least one annular baffle extending at least partially across said second annular space.

22. An adsorption unit according to #21, wherein said annular baffle or, where there is more than one annular baffle, at least one of said annular baffles extends from said outer tubular side wall.

23. An adsorption unit according to #21 or #22, wherein said annular baffle or, where there is more than one annular baffle, at least one of said annular baffles extends from said annular skirt.

24. An adsorption unit according to any of #21 to #23, wherein said annular baffle or, where there is more than one annular baffle, at least of said annular baffles is perforated and extends at least substantially across said second annular space.

25. An adsorption unit according to any of #1 to #24, wherein said unit comprises a first annular baffle extending radially from said annular skirt between said at least one gas inlet and said annular bed, and a second annular baffle extending radially from said outer tubular side wall between said first annular baffle and said annular bed, said baffles located co-axially within said unit and extending partially across said second annular space.

26. An adsorption unit according to #1 to #25, wherein said unit has a longitudinal axis and comprises at least one longitudinal baffle mounted in said unit parallel to said longitudinal axis and extending at least partially across said first annular space.

27. An adsorption unit according to #26, wherein said unit comprises a plurality of said longitudinal baffles.

28. An adsorption unit according to #27, wherein said longitudinal baffles are spaced circumferentially within said unit.

29. An adsorption unit according to #28, wherein said longitudinal baffles are evenly spaced.

30. An adsorption unit according to any of #26 to #29, wherein said at least one longitudinal baffle extends from said outer tubular side wall.

31. An adsorption unit according to any of #1 to #30, wherein said unit has a longitudinal axis and comprises at least one longitudinal baffle mounted in said unit parallel to said longitudinal axis and extending at least partially across said second annular space.

32. An adsorption unit according to #31, wherein said unit comprises a plurality of said longitudinal baffles.

33. An adsorption unit according to #32, wherein said longitudinal baffles are spaced circumferentially within said unit.

34. An adsorption unit according to #33, wherein said longitudinal baffles are evenly spaced.

35. An adsorption unit according to any of #30 to #34, wherein said longitudinal baffle or, where there is more than one of said longitudinal baffles, at least one of said longitudinal baffles extends from said outer tubular side wall.

36. An adsorption unit according to any of #30 to #35, wherein said longitudinal baffle or, where there is more than one longitudinal baffles, at least one of said longitudinal baffles extends from said annular skirt.

37. An adsorption unit according to any of #1 to #36, wherein said unit comprises a frustoconical baffle located co-axially in said second annular space, said frustoconical baffle being positioned in front of and spaced apart from said at least one gas inlet.

38. An adsorption unit according to #37, wherein said frustoconical baffle comprises, with respect to said annular bed, a proximal end and a distal end, said frustoconical baffle being mounted circumferentially at said proximal end on said outer tubular side wall.

39. An adsorption unit according to #38, wherein said proximal end of said frustoconical baffle comprises an annular flange.

40. An adsorption unit according to #39, wherein said annular flange is perforated.

41. An adsorption unit according to any of #37 to #40, wherein said frustoconical baffle is inverted.

42. An adsorption unit according to #1 to #36, wherein said unit comprises a cylindrical baffle located co-axially in said second annular space, said cylindrical baffle being positioned in front of and spaced apart from said at least one gas inlet.

43. An adsorption unit according to #42, wherein said cylindrical baffle comprises, with respect to said annular bed, a proximal end and a distal end, said proximal end comprising an annular flange mounted circumferentially on said annular skirt.

44. An adsorption unit according to #43, wherein said annular flange is perforated.

45. An adsorption unit according to any of #42 to #44, wherein said cylindrical baffle comprising at least one opening, said at least one opening being located opposite said at least one gas inlet.

46. An adsorption unit according to #45, wherein said at least one gas inlet comprises a conduit in fluid communication with said respective opening.

47. An adsorption unit according to #46, wherein said conduit comprises a wall, at least a portion of said wall being perforated.

48. An adsorption unit according to any of #1 to #47, wherein said gas inlet comprises, with respect to said annular bed, a proximal side and a distal side, said unit comprising a gas inlet baffle located at said proximal side of said gas inlet and extending across at least a portion of said second annular space.

49. An adsorption unit according to #48, wherein said gas inlet baffle has an at least substantially U-shaped cross-section.

50. An adsorption unit according to any of #1 to #16, wherein said unit comprises no baffles.

51. An adsorption unit according to any of #1 to #50 for purifying air by removing at least one contaminant selected from the group consisting of water, carbon dioxide, hydrocarbons and $NO_x$.

52. An adsorption unit according to any of #1 to #51, wherein said unit is pressurizable.

53. An adsorption unit according to any of #1 to #52, wherein said unit is rated for operation at a pressure of at least about 3 bar.

54. An adsorption unit according to any of #1 to #53, wherein said unit is rated for operation at a pressure of up to 40 bar.

55. An adsorption unit according to #54, wherein said outer tubular side wall and said end walls comprise carbon steel and have a thickness of no more than about 38 mm.

56. A radial U-flow adsorption unit for purifying air by removal of at least one contaminant selected from the group consisting of water, carbon dioxide, hydrocarbons and $NO_x$, said unit comprising:

an outer tubular side wall comprising a top end and a bottom end opposite said top end, said top and bottom ends being closed by top and bottom end walls respectively;

an elongate annular bed comprising at least one selectively adsorbent material, said annular bed being located co-axially within said outer tubular side wall thereby defining a first annular space between said side wall and said annular bed, said annular bed defining a central channel in fluid communication with said first annular space through said annular bed;

an impermeable annular skirt supporting said annular bed on said bottom end wall, said annular skirt being located co-axially within said outer tubular side wall thereby defining a second annular space between said side wall and said annular skirt, said second annular space being in fluid communication with said first annular space;

at least one gas inlet located in said side wall at said bottom end and in fluid communication with said first annular space through said second annular space; and a gas outlet located in said bottom wall of said unit and in fluid communication with said central channel.

57. A process for removing at least one gaseous component from a gas mixture, said process comprising:

providing a radial U-flow adsorption unit according to claim 1;

feeding a gas mixture to said at least one gas inlet; and removing a product gas from said gas outlet.

58. A process according to #57 for purifying air by removing a contaminant selected from the group consisting of water, carbon dioxide, hydrocarbons and $NO_x$.

59. Use of a radial U-flow adsorption unit according to #1 for purifying air by removing a contaminant selected from the group consisting of water, carbon dioxide, hydrocarbons and $NO_x$.

Preferred embodiments of the present invention will now be described with reference to the figures.

FIG. 1 depicts a radial flow adsorption unit 10 for the removal of water and carbon dioxide impurities from air. The unit 10 is orientated vertically and has an outer tubular side wall 12 with a top end wall 14 and a bottom end wall 16, and contains an annular bed 18 of adsorbent materials, located co-axially within the side wall 12. The side wall 12 and the annular bed 18 define a first annular space 20.

The annular bed 18 has a base plate 22 on which are mounted an outer tubular screen 24, an intermediate tubular screen 26 and an inner tubular screen 28. Each of the tubular screens is gas permeable and together the tubular screens define annular spaces within the annular bed 18 which are filled with adsorbent material. In the illustrated embodiment, the annular bed 18 has a layer 30 of a desiccant with high regenerable capacity for water, and a layer 32 of a $CO_2$-selective adsorbent. The annular spaces between the tubular sheets may be filled with adsorbent materials through the ports 34 on the top wall 14 of the unit 10, which may also be used to remove and replace the adsorbent materials.

The annular bed 18 is supported within the unit 10 on an impermeable annular skirt 36 that, with the side wall 12, defines a second annular space 38 which is in fluid communication with the first annular space 20.

The unit 10 in FIG. 1 has a gas inlet 40 located in the side wall 12 and a gas outlet 42 located in an end wall. The gas outlet 42 is located in the bottom wall 16 of the unit 10 and the gas inlet 40 is located at the end of the side wall 12 adjacent the bottom end wall 16.

During operation, air to be purified is fed to the gas inlet 40 of the unit 10, passes into the first annular space 20 and though the annular bed 18 of adsorbent materials which remove water and $CO_2$ and optionally $N_2O$ from the air. The purified gas passes into a central channel 44 defined by the annular bed 18 and then out of the unit 10 through the gas outlet 42. Since the direction of flow of gas is reversed after passage through the annular bed 18, the unit 10 is configured for U-flow.

During regeneration of the bed 18, the direction of the flow of gas is reversed. Thus, regeneration gas is fed to the unit 10 through the gas outlet 42, passes into the central channel 44 and through the annular bed 18 to regenerate the bed. The spent regeneration gas passes into the first annular space 20 and then out of the unit 20 through the gas inlet 40.

FIG. 2 is a more detailed version of the embodiment depicted in FIG. 1. The features common to both figures have been given the same reference numerals. The following is a discussion of the different features.

Unit 10 has a filter 46 mounted internally on the gas outlet 42. The purpose of the filter 46 is to trap particles entrained in the flow of gas. The particles may be solid particles from the adsorbent bed 18.

The filter is self-cleaning. However, it may be necessary to clean or replace the filter 46 periodically. Thus, there is a covered port 48 in the top wall 14 of the unit 10 to provide access to the filter 46.

Longitudinal baffles 50 are located on the annular skirt 36 to help reduce air flow maldistribution through the unit 10. The longitudinal baffles are depicted as being in line with the gas inlet 40. However, it is to be understood that the baffle may be located further around the circumference of the annular skirt 36 as in FIG. 4.

There is also a drainage system 52 for removing aqueous fluid, e.g. water containing dissolved carbon dioxide, from the unit 10.

In addition, there is an external support skirt 54 which supports the unit 10 on the ground.

Finally, there is a conduit 56 connected to the gas outlet 42.

Figure 3:
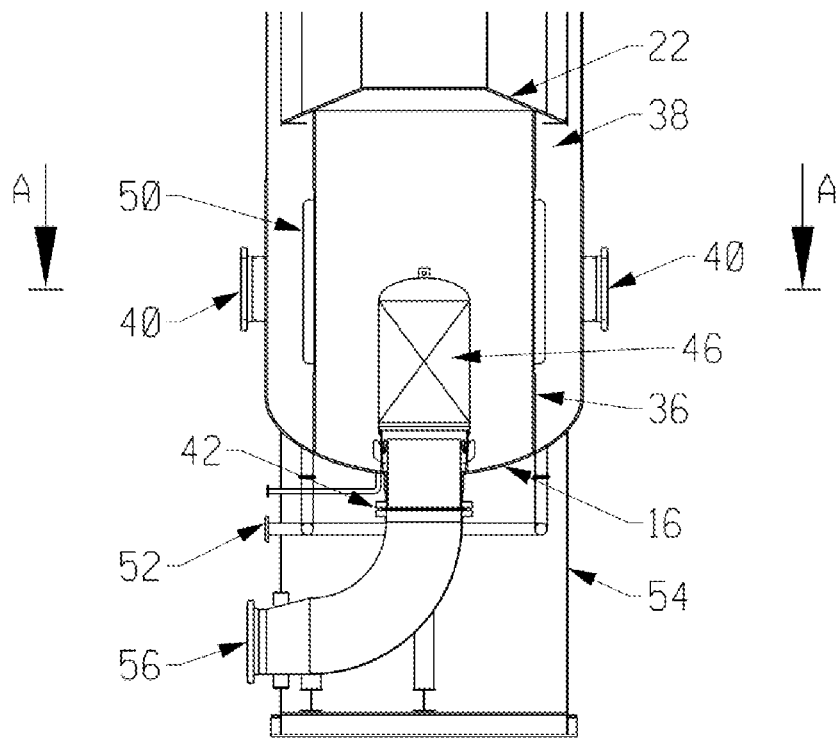
FIG. 3 depicts an alternative version of the embodiment depicted in FIG. 2 having two gas inlets.

FIG. 3 is a more detailed depiction of the bottom end of a unit 10 similar to that depicted in FIG. 2 but having another gas inlet 40. The features common to both figures have been given the same reference numerals.

Figure 4:
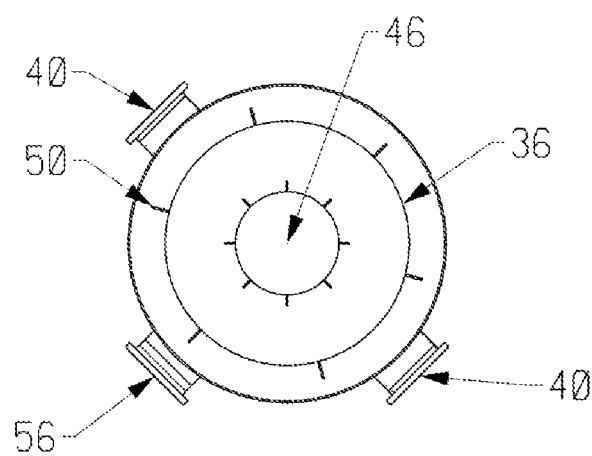
FIG. 4 depicts an alternative version of the embodiment depicted in FIG. 3 in horizontal cross section along line A-A.

FIG. 4 is a cross-sectional view of the bottom end of a unit 10 similar to that depicted in FIG. 3. The features common to both figures have been given the same reference numerals.

There are six longitudinal baffles 50 mounted on the annular skirt 36 in FIG. 4. The baffles 50 are evenly spaced around the circumference of the annular skirt 36 although none of the baffles is in line with the two air inlets 40 as depicted in FIG. 3.

When the unit 10 is transported, it is laid horizontally such that one of the gas inlets 40 and the conduit 56 are orientated diagonally downwards as shown. The side of the unit 10 facing downwards may therefore be referred to as a "shipping face".

Figure 5:
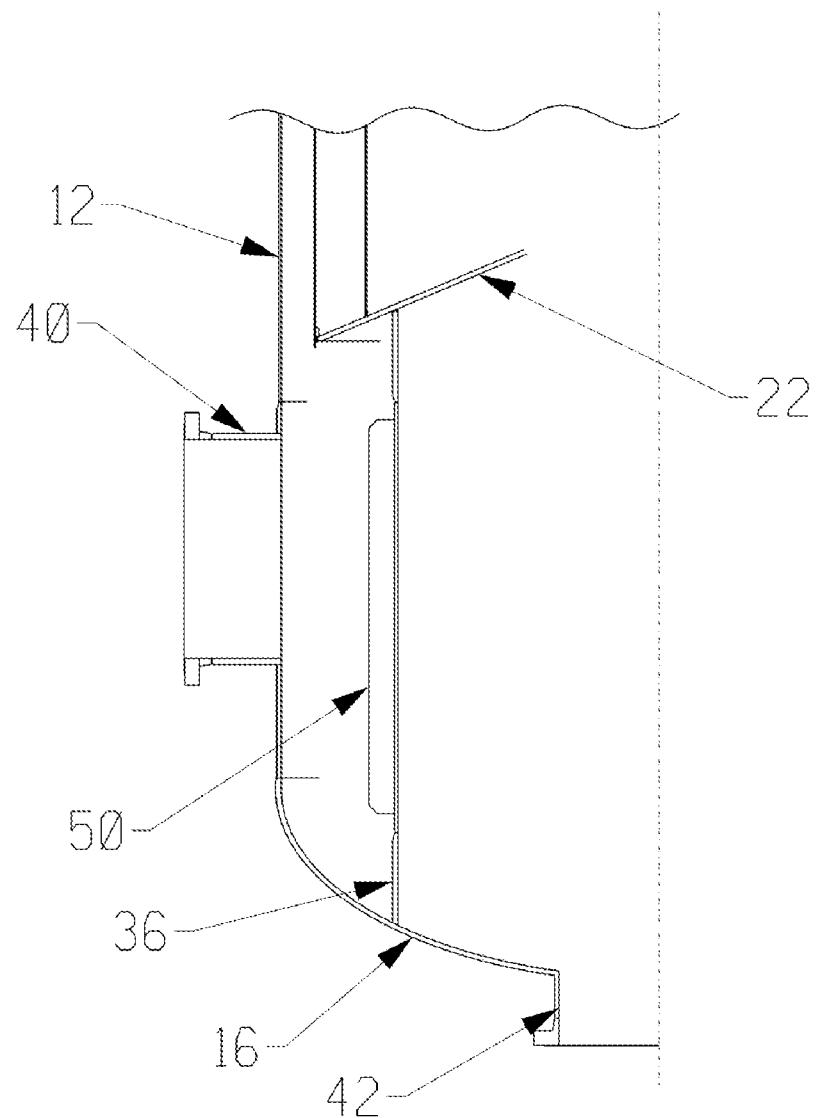
FIG. 5 depicts in more detail one of the longitudinal baffles depicted in FIG. 3.

FIG. 5 is a more detailed depiction of the longitudinal baffle 50 of FIG. 3. Some features of the unit 10 of FIG. 2 have been omitted for clarity. The features common to both figures have been given the same reference numerals.

Figure 6:
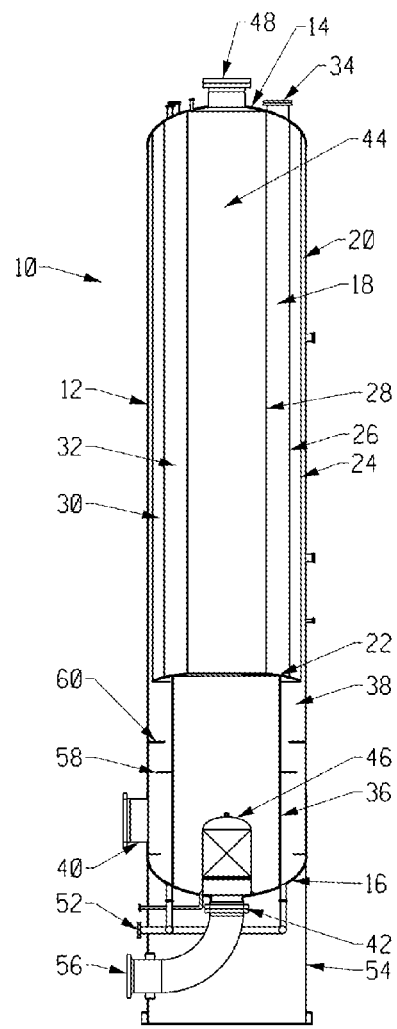
FIG. 6 depicts an alternative version of the embodiment depicted in FIG. 2 having annular baffles.
Figure 7:
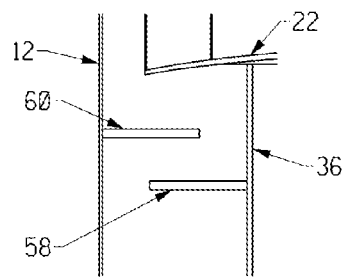
FIG. 7 is a more detailed diagram of the arrangement of annular baffles in FIG. 6.

FIGS. 6 & 7 depict a modified version of the unit 10 shown in FIG. 2. The features that are common to both figures have been given the same reference numerals. The following is a discussion of the different features.

A pair of horizontal annular baffles 58, 60 is provided. A first annular baffle 58 is mounted circumferentially on the outside surface of the annular skirt 36 between the gas inlet 40 and the annular bed 18. A second annular baffle 60 is mounted circumferentially on the inside surface of the side wall 12 between the first annular baffle 58 and the annular bed 18. Both annular baffles 58, 60 are unperforated and extend into the second annular space 38.

Figure 8A:
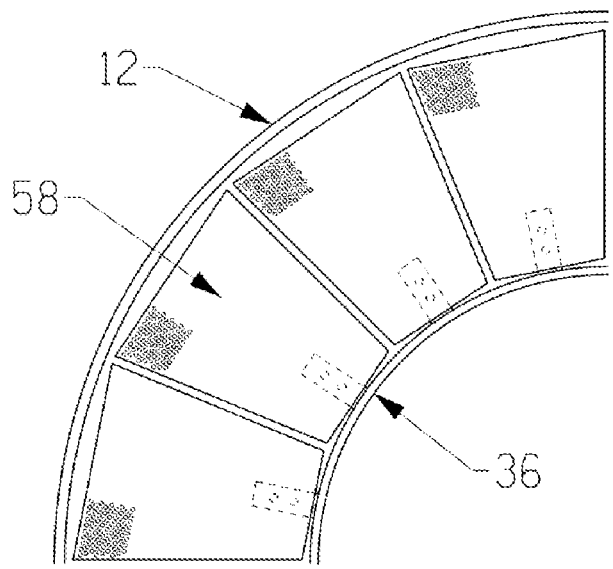
FIG. 8A depicts an example of a perforated annular baffle in use with a unit according to the present invention in partial horizontal cross section.
Figure 8B:
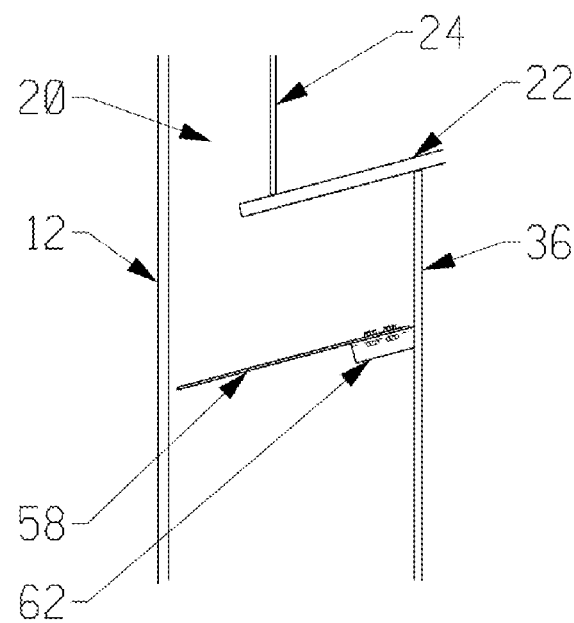
FIG. 8B depicts the embodiment of FIG. 8A in partial vertical cross section.

FIGS. 8A & 8B depict a different design of annular baffle 58 to that shown in FIGS. 6 & 7. The baffle 58 is made up of a plurality of individual trapezoidal perforated plates, each plate being mounted to the annular skirt by a clip 62. The baffle is inclined to allow aqueous liquid, e.g. water containing dissolved carbon dioxide, collecting on the surface of the baffle to run off.

Figure 9:
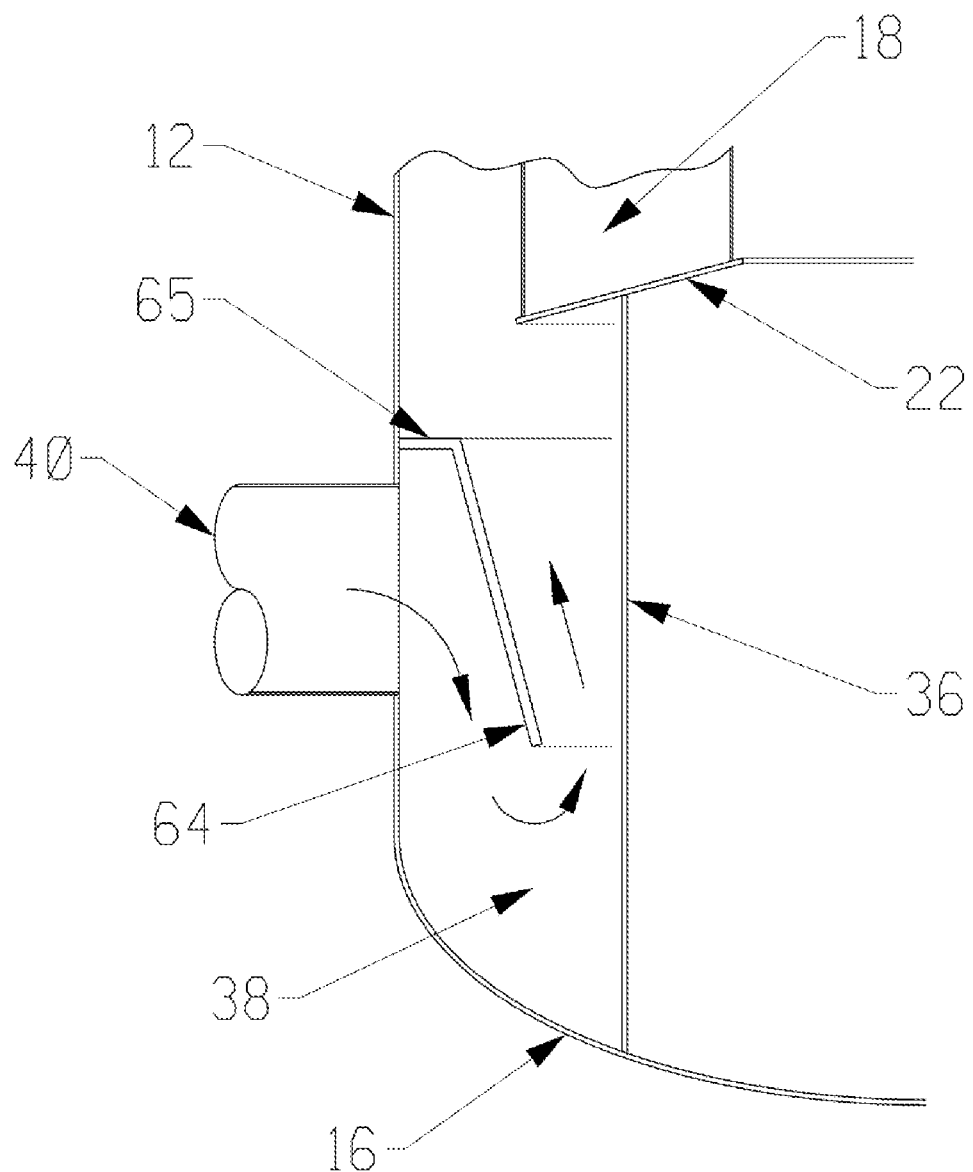
FIG. 9 is a vertical partial cross section through a further unit according to the present invention having an inverted frustoconical baffle at the inlet.

FIG. 9 depicts an inverted frustoconical baffle 64 mounted coaxially within the second annular space 38 on the side wall 12 via an unperforated annular flange 65. Incoming air is initially forced by the baffle downwards and circumferentially, and the air then turns upwards into a diverging chamber where the velocity decreases, thereby evening the flow of air prior to the first annular space 20.

Figure 10:
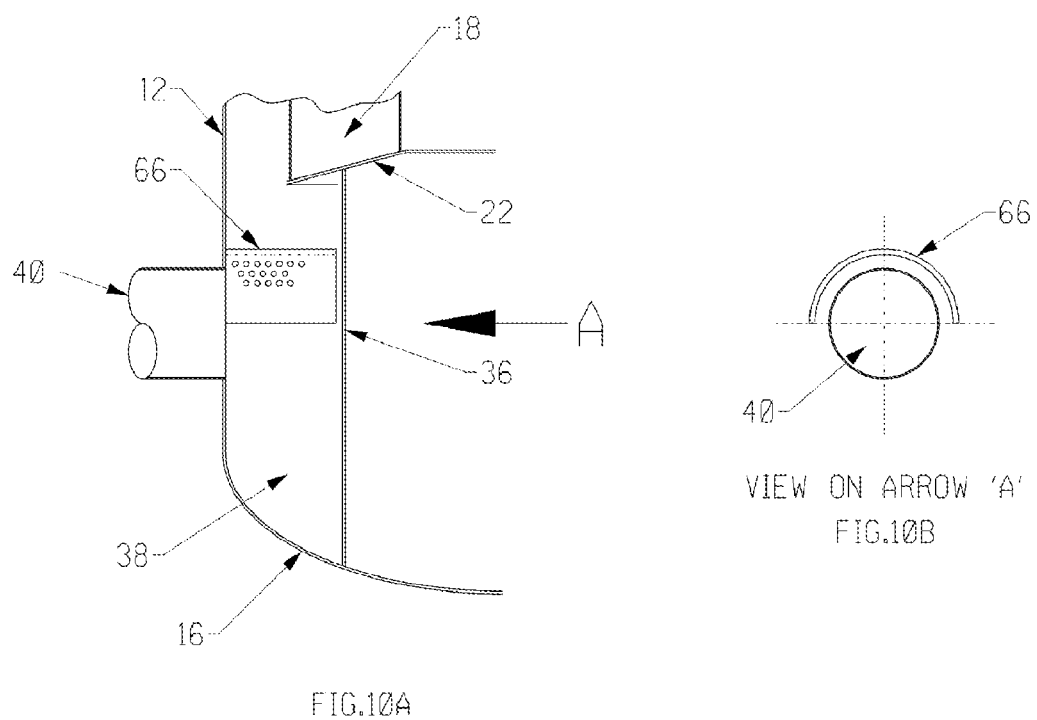
FIG. 10A is a vertical partial cross section though the unit of FIG. 9 in which the frustoconical baffle is replaced with a perforated gas inlet baffle.
FIG. 10B depicts the perforated gas inlet baffle of FIG. 10A along the arrow A.

FIGS. 10A & 10B depict a perforated gas inlet baffle 66 that extends from the side wall 12 above the gas inlet 40 and has a U-shaped cross section. Much of the incoming air is initially forced away from the annular bed which helps even the flow of air to the first annular space 30.

Figure 11:
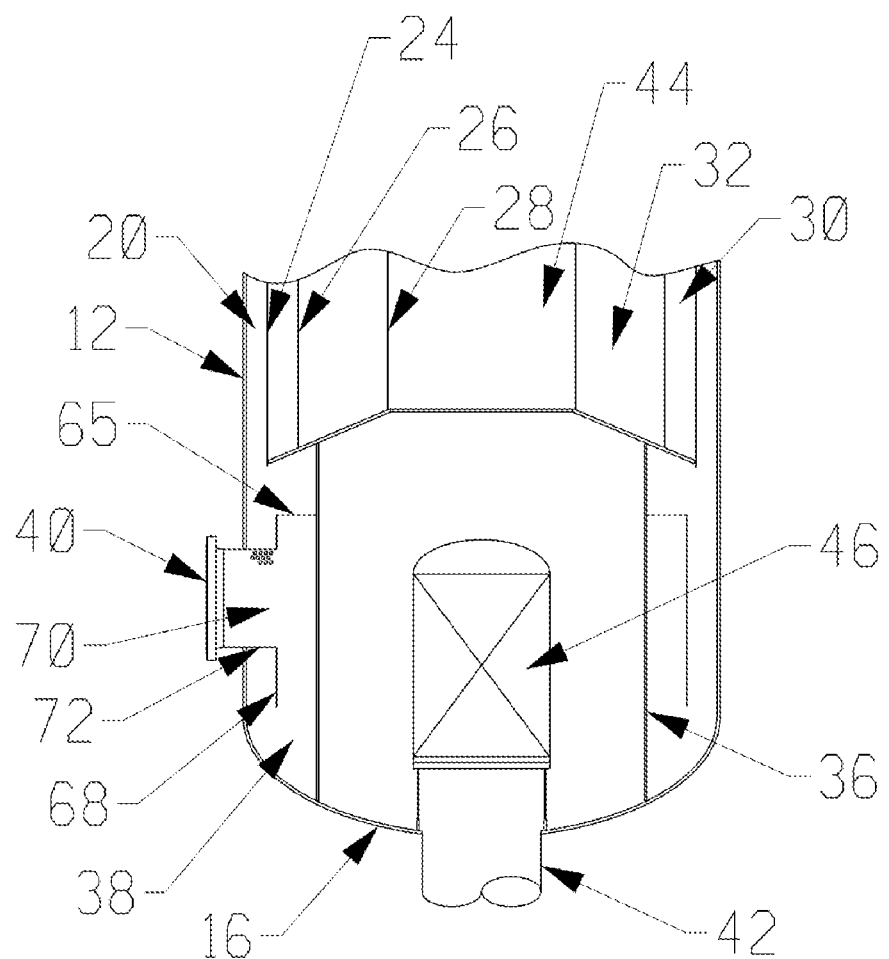
FIG. 11 is a partial cross section through another unit according to the present invention having a cylindrical baffle at the inlet.

FIG. 11 depicts a cylindrical baffle 68 mounted co-axially within the second annular space 38 on the annular skirt 36 via a perforated annular flange 65. The baffle 68 has an opening 70 that is connected to the gas inlet 40 by a perforated conduit 72. Much of the incoming air is initially forced by the baffle away from the annular bed 18 and instead travels around the annular skirt 36 before turning upwards around the bottom end of the baffle thereby evening the flow of air prior to the first annular space 20.

Figure 12A:
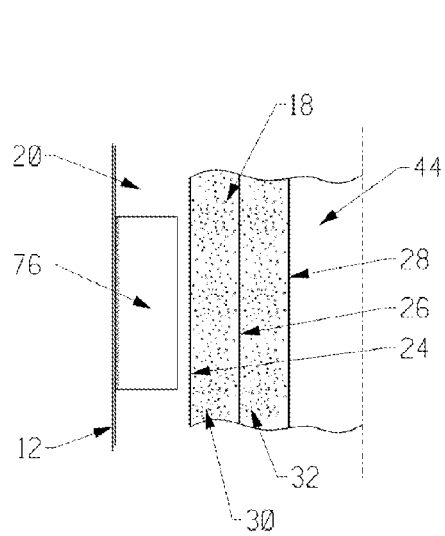
FIG. 12A is a partial vertical cross section through another unit according to the present invention having longitudinal baffles in the first annular space.
Figure 12B:
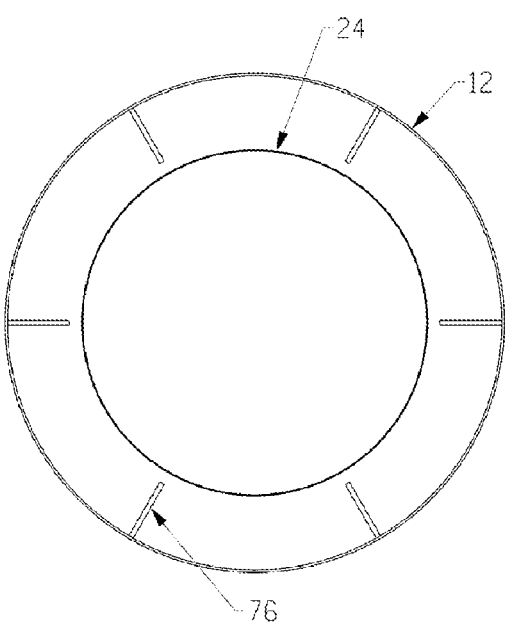
FIG. 12B is a simplified horizontal cross section though the unit of FIG. 12A.

FIGS. 12A & 12B depict an example of longitudinal baffles 76 extending from the outer tubular side wall 12 across most the of first annular space 20. These baffles are intended to reduce gas flow maldistribution within the first annular space 20.

EXAMPLE

Computer simulations of the air purification process of U.S. Pat. No. 5,855,650A under the conditions identified in Table 1 of that reference have been carried out using proprietary software and data, and have identified the following preferred conditions of operation of the unit depicted in FIG. 2:

|  |  | Disclosed Apparatus and Process | |
| --- | --- | --- | --- |
| Process conditions | Unit | Preferred | Most preferred |
| On-stream time | min | 100 to 250 | 120 to 200 |
| Purge to air ratio | — | 0.1 to 0.5 | 0.1 to 0.3 |
| Air Flow | Kg/s | 50 to 300 | 100 to 250 |
| Feed $CO_2$ concentration | ppm | 100 to 2000 | 300 to 600 |
| Feed temperature | C. | 5 to 50 | 10 to 30 |
| Feed pressure | bar | 1 to 40 | 4 to 7 |
| Hot regeneration temperature | C. | 100 to 300 | 140 to 200 |
| Hot purge duration | min | 20 to 70 | 25 to 50 |

While the invention has been described with reference to the preferred embodiments depicted in the figures, it will be appreciated that various modifications are possible within the spirit or scope of the invention.

In this specification, unless expressly otherwise indicated, the word 'or' is used in the sense of an operator that returns a true value when either or both of the stated conditions are met, as opposed to the operator 'exclusive or' which requires only that one of the conditions is met. The word 'comprising' is used in the sense of 'including' rather than to mean 'consisting of'. All prior teachings above are hereby incorporated herein by reference. No acknowledgement of any prior published document herein should be taken to be an admission or representation that the teaching thereof was common general knowledge in Australia or elsewhere at the date thereof.

The invention claimed is:

1. A radial U-flow adsorption unit for purifying air by removal of at least one contaminant selected from the group consisting of water, carbon dioxide, hydrocarbons and $NO_x$, said unit comprising:
   an outer tubular side wall having a longitudinal axis and comprising a top end and a bottom end opposite said top end, said top and bottom ends being closed by top and bottom end walls respectively;
   an elongated annular bed comprising at least one selectively adsorbent material, said annular bed being located co-axially within said outer tubular side wall thereby defining a first annular space between said side wall and said annular bed, said annular bed defining a central channel in fluid communication with said first annular space through said annular bed;
   an impermeable annular skirt supporting said annular bed on said bottom end wall, said annular skirt being located co-axially within said outer tubular side wall thereby defining a second annular space between said outer tubular side wall and said annular skirt, said second annular space being in fluid communication with said first annular space;
   at least one gas inlet located in said outer tubular side wall at said bottom end and in fluid communication with said first annular space through said second annular space; and
   a gas outlet located in said bottom wall of said unit and in fluid communication with said central channel.

2. The adsorption unit according to claim 1, wherein said unit comprises a single gas inlet.

3. The adsorption unit according to claim 1, wherein said unit comprises a plurality of gas inlets.

4. The adsorption unit according to claim 3, wherein said gas inlets are spaced circumferentially around said outer tubular side wall.

5. The adsorption unit according to claim 4, wherein said gas inlets are evenly spaced.

6. The adsorption unit according to claim 4, wherein each gas inlet is located at a distance from said annular bed, said distance being equal for each gas inlet.

7. The adsorption unit according to claim 3, wherein said unit comprises a first gas inlet and a second gas inlet.

8. The adsorption unit according to claim 7, wherein said second gas inlet is located opposite said first gas inlet.

9. The adsorption unit according to claim 1, wherein said at least one gas inlet is orientated radially to said longitudinal axis.

10. The adsorption unit according to claim 1, wherein said unit comprises no baffles.

11. The adsorption unit according to claim 1, wherein said unit comprises at least one baffle for reducing gas flow maldistribution in said first annular space.

12. The adsorption unit according to claim 11, wherein said at least one baffle is selected from the group consisting of annular baffles, longitudinal baffles, frustoconical baffles, cylindrical baffles and gas inlet baffles.

13. The adsorption unit according to claim 11, wherein said baffle or, where there is more than one baffle, at least one of said baffles is perforated.

14. The adsorption unit according to claim 13, wherein said perforated baffle has an open area from about 10% to about 60%.

15. The adsorption unit according to claim 1, wherein said unit comprises at least one annular baffle located co-axially within said unit between said at least one gas inlet and said annular bed, said at least one annular baffle extending at least partially across said second annular space.

16. The adsorption unit according to claim 15, wherein said annular baffle or, where there is more than one annular baffle, at least one of said annular baffles extends from said outer tubular side wall.

17. The adsorption unit according to claim 15, wherein said annular baffle or, where there is more than one annular baffle, at least one of said annular baffles extends from said annular skirt.

18. The adsorption unit according to claim 15, wherein said annular baffle or, where there is more than one annular baffle, at least of said annular baffles is perforated and extends at least substantially across said second annular space.

19. The adsorption unit according to claim 1, wherein said unit comprises a first annular baffle extending radially from said annular skirt between said at least one gas inlet and said annular bed, and a second annular baffle extending radially from said outer tubular side wall between said first annular baffle and said annular bed, said baffles located co-axially within said unit and extending partially across said second annular space.

20. The adsorption unit according to claim 1, wherein said unit comprises at least one longitudinal baffle mounted in said unit parallel to said longitudinal axis and extending at least partially across said first annular space.

21. The adsorption unit according to claim 20, wherein said unit comprises a plurality of said longitudinal baffles.

22. The adsorption unit according to claim 21, wherein said longitudinal baffles are spaced circumferentially within said unit.

23. The adsorption unit according to claim 22, wherein said longitudinal baffles are evenly spaced.

24. The adsorption unit according to claim 20, wherein said at least one longitudinal baffle extends from said outer tubular side wall.

25. The adsorption unit according to claim 1, wherein said unit comprises at least one longitudinal baffle mounted in said unit parallel to said longitudinal axis and extending at least partially across said second annular space.

26. The adsorption unit according to claim 25, wherein said unit comprises a plurality of said longitudinal baffles.

27. The adsorption unit according to claim 26, wherein said longitudinal baffles are spaced circumferentially within said unit.

28. The adsorption unit according to claim 27, wherein said longitudinal baffles are evenly spaced.

29. The adsorption unit according to claim 25, wherein said longitudinal baffle or, where there are more than one of said longitudinal baffles, at least one of said longitudinal baffles extends from said outer tubular side wall.

30. The adsorption unit according to claim 25, wherein said longitudinal baffle or, where there are more than one longitudinal baffles, at least one of said longitudinal baffles extends from said annular skirt.

31. The adsorption unit according to claim 1, wherein said unit comprises a frustoconical baffle located co-axially in said second annular space, said frustoconical baffle being positioned in front of and spaced apart from said at least one gas inlet.

32. The adsorption unit according to claim 31, wherein said frustoconical baffle comprises, with respect to said annular bed, a proximal end and a distal end, said frustoconical baffle being mounted circumferentially at said proximal end on said outer tubular side wall.

33. The adsorption unit according to claim 32, wherein said proximal end of said frustoconical baffle comprises an annular flange.

34. The adsorption unit according to claim 33, wherein said annular flange is perforated.

35. The adsorption unit according to claim 31, wherein said frustoconical baffle is inverted.

36. The adsorption unit according to claim 1, wherein said gas inlet comprises, with respect to said annular bed, a proximal side and a distal side, said unit comprising a gas inlet baffle located at said proximal side of said gas inlet and extending across at least a portion of said second annular space.

37. The adsorption unit according to claim 36, wherein said gas inlet baffle has an at least substantially U-shaped cross-section.

38. The adsorption unit according to claim 1, wherein said unit comprises a cylindrical baffle located co-axially in said second annular space, said cylindrical baffle being positioned in front of and spaced apart from said at least one gas inlet.

39. The adsorption unit according to claim 38, wherein said cylindrical baffle comprises, with respect to said annular bed, a proximal end and a distal end, said proximal end comprising an annular flange mounted circumferentially on said annular skirt.

40. The adsorption unit according to claim 39, wherein said annular flange is perforated.

41. The adsorption unit according to claim 39, wherein said cylindrical baffle comprising at least one opening, said at least one opening being located opposite said at least one gas inlet.

42. The adsorption unit according to claim 41, wherein said at least one gas inlet comprises a conduit in fluid communication with said respective opening.

43. The adsorption unit according to claim 42, wherein said conduit comprises a wall, at least a portion of said wall being perforated.

44. The adsorption unit according to claim 1, wherein said unit is pressurizable.

45. The adsorption unit according to claim 1, wherein said unit is rated for operation at a pressure of at least about 3 bar.

46. The adsorption unit according to claim 45, wherein said unit is rated for operation at a pressure of up to 40 bar.

47. The adsorption unit according to claim 46, wherein said outer tubular side wall and said end walls comprise carbon steel and have a thickness of no more than 38 mm.

* * * * *